(12) United States Patent
Berjot et al.

(10) Patent No.: US 12,337,980 B2
(45) Date of Patent: Jun. 24, 2025

(54) AIRCRAFT PROPULSION ASSEMBLY HAVING A DEVICE FOR REACTING THRUST FORCES

(71) Applicant: Airbus Operations SAS, Toulouse (FR)

(72) Inventors: Michael Berjot, Toulouse (FR); Germain Gueneau, Toulouse (FR); Pierre-Antoine Combes, Toulouse (FR); Paul-Adrien Taveau, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/471,721

(22) Filed: Sep. 21, 2023

(65) Prior Publication Data
US 2024/0101262 A1 Mar. 28, 2024

(30) Foreign Application Priority Data
Sep. 23, 2022 (FR) ...................................... 2209679

(51) Int. Cl.
 *B64D 27/40* (2024.01)
(52) U.S. Cl.
 CPC .................. *B64D 27/406* (2024.01)
(58) Field of Classification Search
 CPC .................................................. B64D 27/406
 See application file for complete search history.

(56) References Cited

U.S. PATENT DOCUMENTS

| | | | |
|---|---|---|---|
| 7,083,143 B2 * | 8/2006 | Whitmer | B64D 27/18 244/54 |
| 2010/0127118 A1 | 5/2010 | Combes et al. | |
| 2014/0061375 A1 | 3/2014 | Sandy et al. | |
| 2014/0217234 A1 | 8/2014 | Dezeustre | |
| 2020/0346772 A1 | 11/2020 | Lansiaux et al. | |

FOREIGN PATENT DOCUMENTS

| | | | |
|---|---|---|---|
| EP | 3792182 A1 | 3/2021 | |
| FR | 2915177 A1 | 10/2008 | |
| FR | 2917713 A1 * | 12/2008 | ............. B64D 27/26 |
| FR | 3093704 A1 | 9/2020 | |
| WO | 2013050714 A1 | 4/2013 | |
| WO | 2014036554 A1 | 3/2014 | |

OTHER PUBLICATIONS

French Search Report for corresponding French Patent Application No. 2209679 dated May 2, 2023.

* cited by examiner

*Primary Examiner* — Joshua D Huson
*Assistant Examiner* — Shanna Danielle Glover
(74) *Attorney, Agent, or Firm* — Greer, Burns & Crain, Ltd.

(57) ABSTRACT

A propulsion assembly for an aircraft, having a turbomachine, a pylon, and a device for reacting thrust forces having a main fitting, a spreader pivoting on the main fitting and having an opening, two rods articulated to the turbomachine and to the spreader, a secondary fitting fastened beneath the pylon and having a secondary female clevis constituted of two secondary arms passed through by holes of oblong shape and aligned along a secondary axis (R2), wherein the spreader is housed in the secondary female clevis of the secondary fitting, wherein the opening is coaxial with the secondary axis (R2), and a backup connection pin inserted with a tight fit into the opening and with clearance into the holes. Also an aircraft with such a propulsion assembly.

4 Claims, 6 Drawing Sheets

PRIOR ART

AIRCRAFT PROPULSION ASSEMBLY HAVING A DEVICE FOR REACTING THRUST FORCES

CROSS-REFERENCES TO RELATED APPLICATIONS

This application claims the benefit of French Patent Application Number 2209679 filed on Sep. 23, 2022, the entire disclosure of which is incorporated herein by way of reference.

FIELD OF THE INVENTION

The present invention relates to the general field of attaching a turbomachine beneath the wing of an aircraft. It relates in particular to an aircraft propulsion assembly having an engine, a pylon beneath which the engine is suspended by means of engine attachments and a device for reacting thrust forces generated by the engine.

BACKGROUND OF THE INVENTION

Patent application EP3792182 discloses a propulsion assembly that comprises, at the front, taking the direction of movement of the aircraft in the air as reference, a front engine attachment, at the rear, a rear engine attachment, and between the two engine attachments, a device for reacting thrust forces of the engine.

Figure 8:
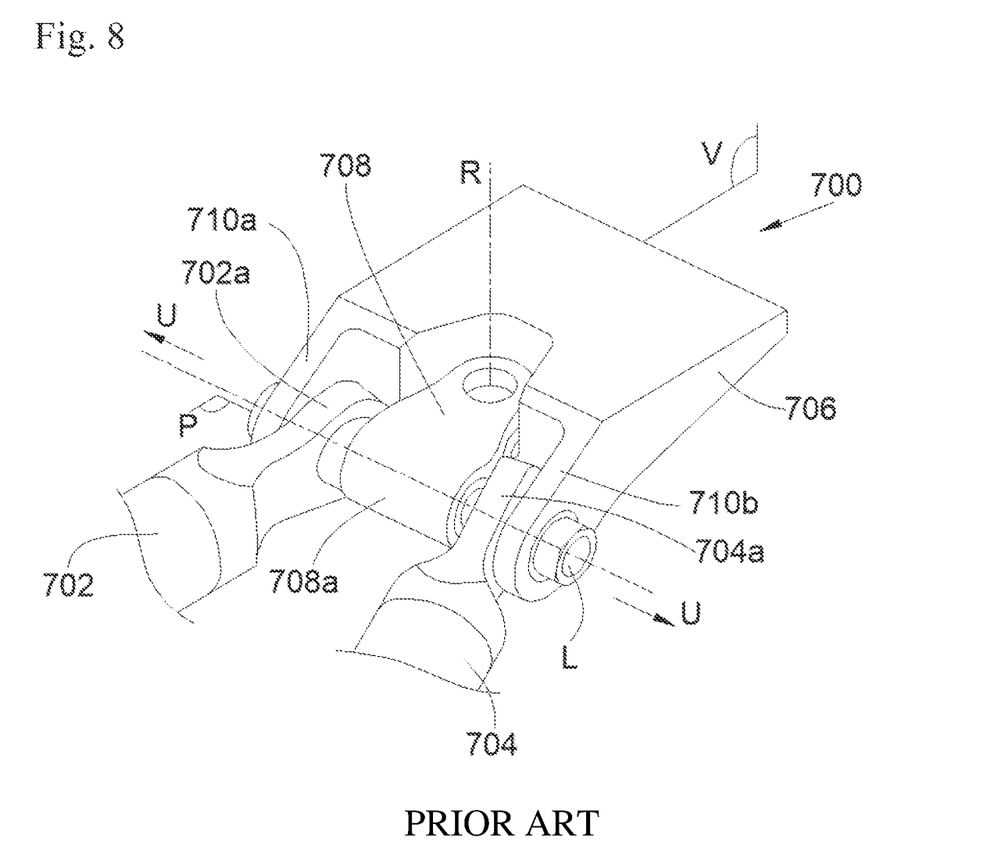
FIG. 8 is a perspective view of a device for reacting thrust forces of the prior art.

With reference to FIG. 8, the device for reacting thrust forces 700 described in the above-mentioned application comprises two thrust reaction rods 702 and 704 (or thrust links) disposed on either side of a median vertical plane V of the propulsion assembly and that each have a front end attached to the engine and a rear end 702a, 704a articulated to a main fitting 706 via a spreader 708. The spreader 708 is mounted so as to be able to pivot on the main fitting 706 about a rotation axis R disposed in the median vertical plane V and orthogonal to a mean plane for transmission of the thrust forces P comprising the longitudinal axes of the two rods 702 and 704. The spreader 708 is arranged between two arms 710a-b of the main fitting 706, which are symmetrical to one another with respect to the median vertical plane V.

The two rods 702 and 704 are connected to the spreader 706 by a single connection pin L mounted horizontally, which is disposed in the mean plane for transmission of the forces P and orthogonal to the rotation axis R. The connection pin L is inserted into a bearing 708a of the spreader 708 and on each side of the latter, through a ball joint ring mounted at the rear end 702a, 704a of each rod 702, 704. The connection pin L mechanically connects, on the one hand, without clearance, the rods 702 and 704 to the spreader 706, and on the other hand, with clearance, the rods 702 and 704 to the main fitting 706 via the two arms 710a-b of the main fitting 706.

Such a device for reacting thrust forces 700 is advantageous in that the mounting of the rods 702 and 704 by means of a connection pin L mounted horizontally makes it possible to optimize the compactness and also the access for operators via the left and right sides of the propulsion assembly.

By contrast, the design of such a device for reacting thrust forces 700 leads to out-of-plane forces directed towards the sides and the outside of the device (forces along the arrows U) at each interface of a rod 702, 704 with the spreader 708, and this may ultimately cause premature wear of the ball joint rings.

Consequently, there is a need to modify the design of the device for reacting forces as described above in order to overcome this drawback, while at the same time retaining a mounting of the rods for a connection pin mounted horizontally and guaranteeing secondary force paths in the event of a component breaking.

SUMMARY OF THE INVENTION

An object of the present invention is to propose an aircraft propulsion assembly having an engine, a pylon beneath which the engine is suspended by means of engine attachments and a device for reacting thrust forces generated by the engine.

To that end, a propulsion assembly for an aircraft is proposed, said propulsion assembly having a median vertical plane and having:
  a turbomachine,
  a pylon,
  at the front, a front engine attachment fastening the turbomachine to the pylon,
  at the rear, a rear engine attachment fastening the turbomachine to the pylon, and
  a device for reacting thrust force having:
  a main fitting fastened beneath the pylon,
  a spreader mounted so as to be able to pivot on the main fitting about a main axis and having an opening,
  two rods for reacting the thrust forces of the engine that are disposed on either side of the median vertical plane, each rod having a front end articulated to the turbomachine and a rear end articulated to the spreader, wherein each rod has a longitudinal axis, wherein the two longitudinal axes define a mean plane for transmission of the thrust forces, wherein the main axis is orthogonal to the mean plane for transmission of the thrust forces and comprised in the median vertical plane, wherein the rear end of each rod is articulated to the spreader about a front connection axis parallel to the main axis and wherein the two front connection axes are symmetrical with respect to the median vertical plane,
  a secondary fitting fastened beneath the pylon in front of the main fitting and having a secondary female clevis constituted of two secondary arms, each one being passed through by a hole of oblong shape wherein the two holes are aligned along a secondary axis included in the mean plane for transmission of the thrust forces and perpendicular to the median vertical plane, and wherein the major axis of each hole is included in the mean plane for transmission of the thrust forces and perpendicular to the secondary axis, wherein the spreader is housed in the secondary female clevis of the secondary fitting, wherein the opening is coaxial with the secondary axis, and
  a backup connection pin inserted with a tight fit into the opening and with clearance into the holes.

With such an arrangement, the device for reacting the thrust forces is improved and has secondary force transfer paths.

Advantageously, the rear engine attachment is articulated to the main fitting.

Advantageously, the main fitting comprises a central flange passed through by a through-bore coaxial with the main axis, the spreader has a female rear clevis into which the central flange is introduced, the female rear clevis is constituted of two rear arms wherein each one is passed through by a rear bore coaxial with the main axis, the device for reacting thrust force has a rear connection pin fitted in the through-bore of the central flange and the rear bores of the female rear clevis, for each rod, the spreader has a female front clevis into which the rear end of said rod, which is passed through by a through-bore coaxial with the corresponding front connection axis, is introduced, each female front clevis is constituted of two front arms wherein each one is passed through by a front bore coaxial with the corresponding front connection axis, and for each rod, the device for reacting thrust forces has a front connection pin fitted in the through-bore of said rod and in the front bores of the female front clevis.

Advantageously, the spreader has a body and two flanks, the body is passed through by the opening and has the rear arms and the front arms, each flank bears externally against a rear arm and a front arm of each female front clevis, for each rear bore, the flank adjoining the rear arm corresponding to said rear bore is passed through by a rear secondary bore coaxial with said rear bore, the rear connection pin also passes through the rear secondary bores of the flanks, for each front bore of a female front clevis, the flank adjoining the front arm corresponding to said front bore is passed through by a front secondary bore coaxial with said front bore and the front connection pin also passes through the front secondary bores of the flanks.

The invention also proposes an aircraft, a wing and a propulsion assembly according to one of the preceding variants, of which the pylon is fastened beneath the wing.

BRIEF DESCRIPTION OF THE DRAWINGS

The abovementioned features of the invention, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
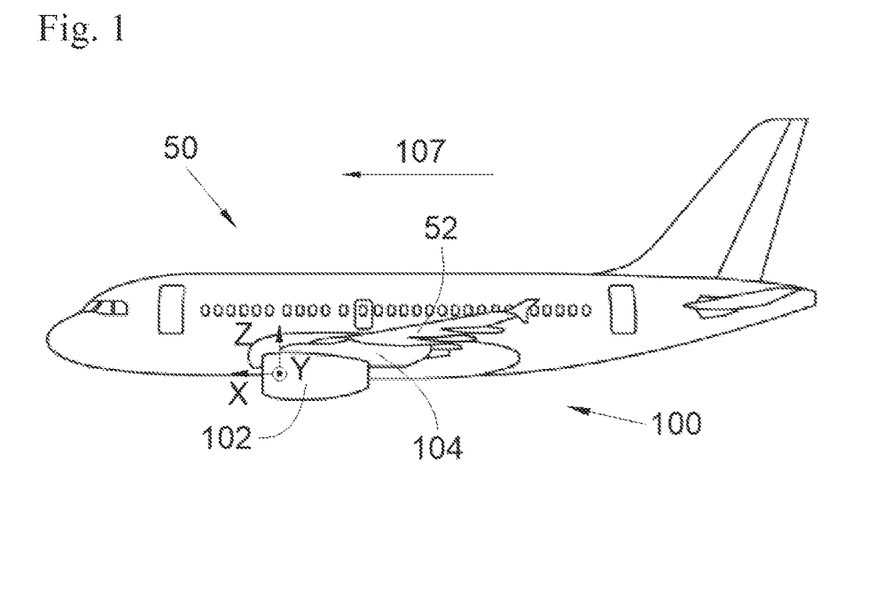
FIG. 1 shows a side view of an aircraft according to the invention.

FIG. 1 shows an aircraft 50 that has a wing 52 beneath which is mounted a propulsion assembly 100 that has a turbomachine 102 and a pylon 104.

By convention, X denotes the longitudinal direction of the turbomachine 102, this direction X being parallel to a longitudinal axis of the turbomachine 102. Y denotes the transverse direction of the turbomachine 102, which is horizontal when the aircraft is on the ground, and Z denotes the vertical direction or vertical height when the aircraft is on the ground, these three directions X, Y and Z being mutually orthogonal. The propulsion assembly 100 has a median vertical plane V (XZ) that passes through the longitudinal axis of the turbomachine 102 and is orthogonal to the ground and that divides the propulsion assembly 100 into two parts, one left and one right, which are generally symmetrical to one another.

The terms "front" and "rear" are to be considered relative to a direction of forward movement of the aircraft 50 under the effect of the thrust provided by the turbomachine 102 in operation, this direction being schematically shown by the arrow 107.

Figure 2:
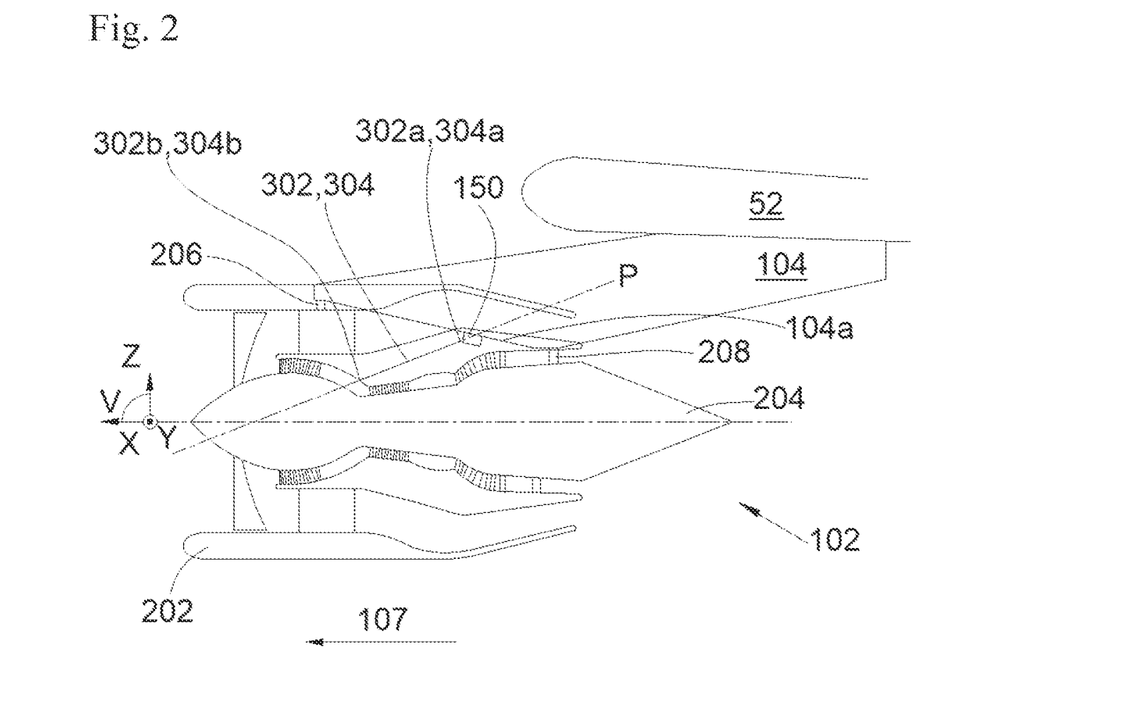
FIG. 2 is a schematic view in longitudinal cross section of a propulsion assembly according to the invention, attached to a wing of an aircraft.

FIG. 2 shows the propulsion assembly 100 that has the turbomachine 102 and the pylon 104 via which the turbomachine 102 is fastened beneath the wing 52. The turbomachine 102 has a nacelle 202 that surrounds an engine 204 suspended from the pylon 104. The engine 204 extends from front to rear along the longitudinal axis of the turbomachine 102 and the pylon 104 has a planar lower face 104a oriented towards the ground.

The engine 204 is fastened to the pylon 104 by a set of engine attachments, which are fastened both to the pylon 104 and to the engine 204. These engine attachments comprise, at the front, a front engine attachment 206, at the rear, a rear engine attachment 208, and between the front and rear engine attachments, a device for reacting thrust forces 150. The front engine attachment 206 and rear engine attachment 208 will not be described in greater detail.

Figure 3:
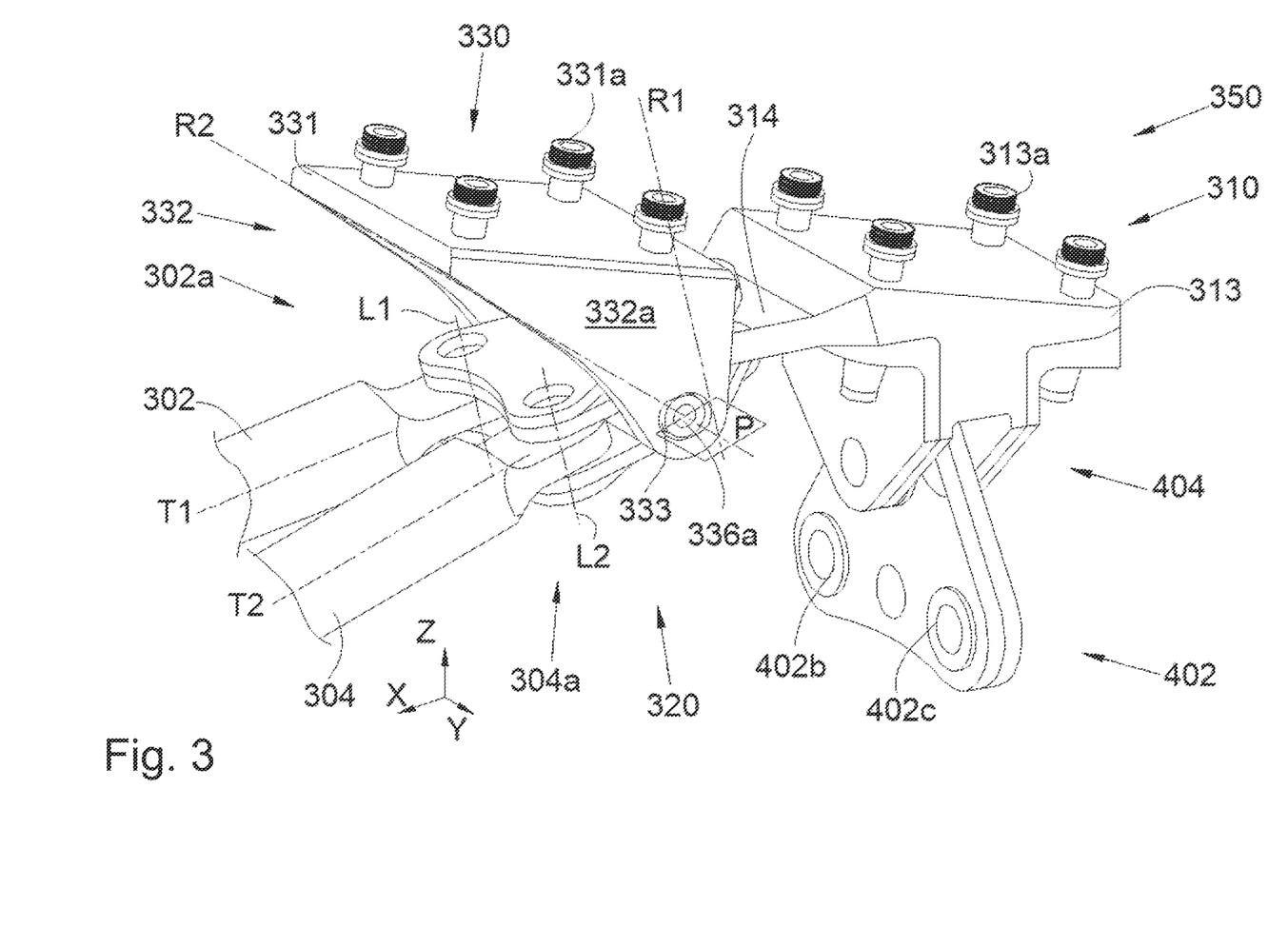
FIG. 3 is a perspective view of a device for reacting thrust forces of the propulsion assembly shown in FIG. 2, according to a first embodiment of the invention.
Figure 4:
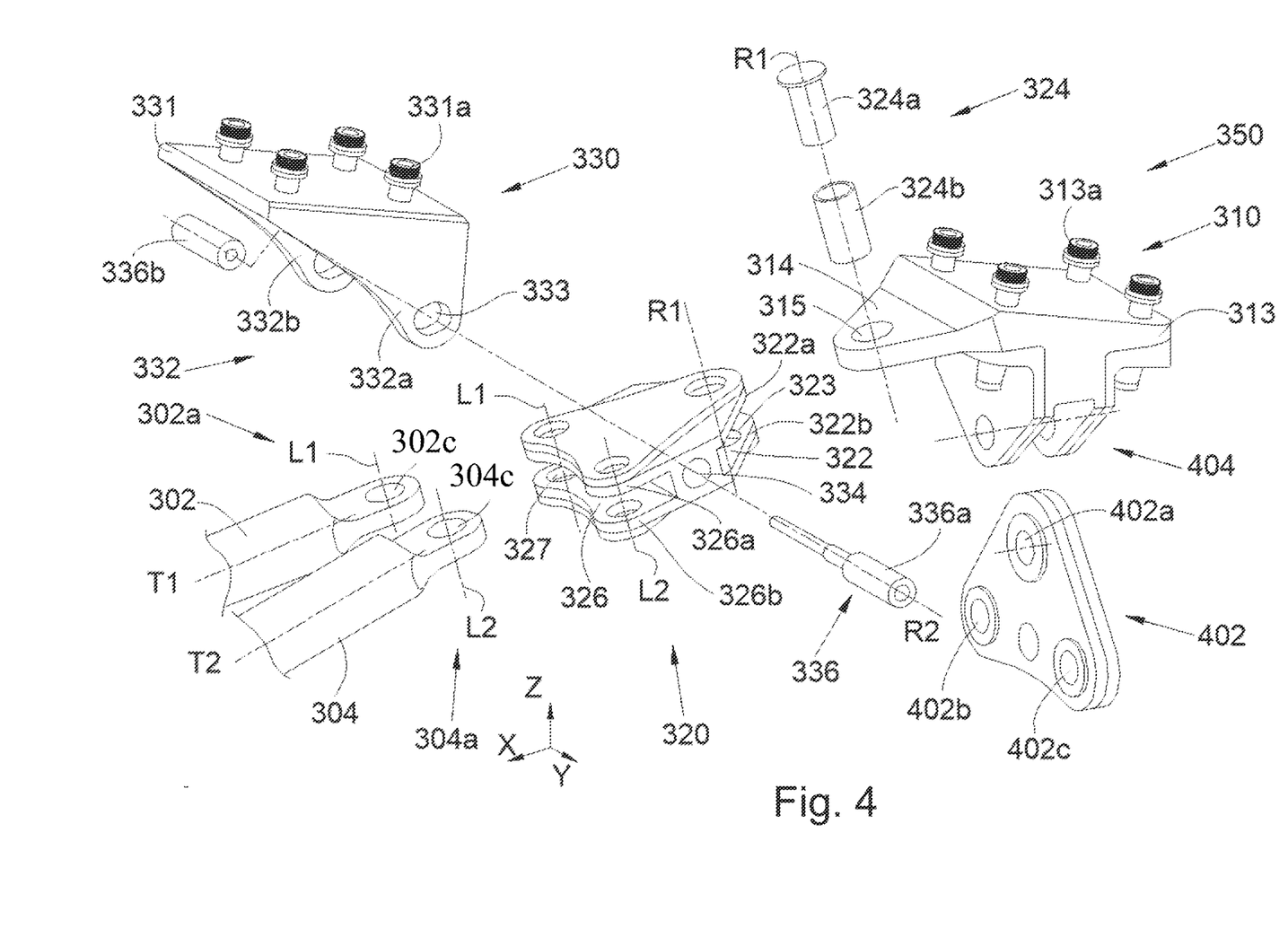
FIG. 4 is an exploded perspective view of the device for reacting thrust forces in FIG. 3.
Figure 5:
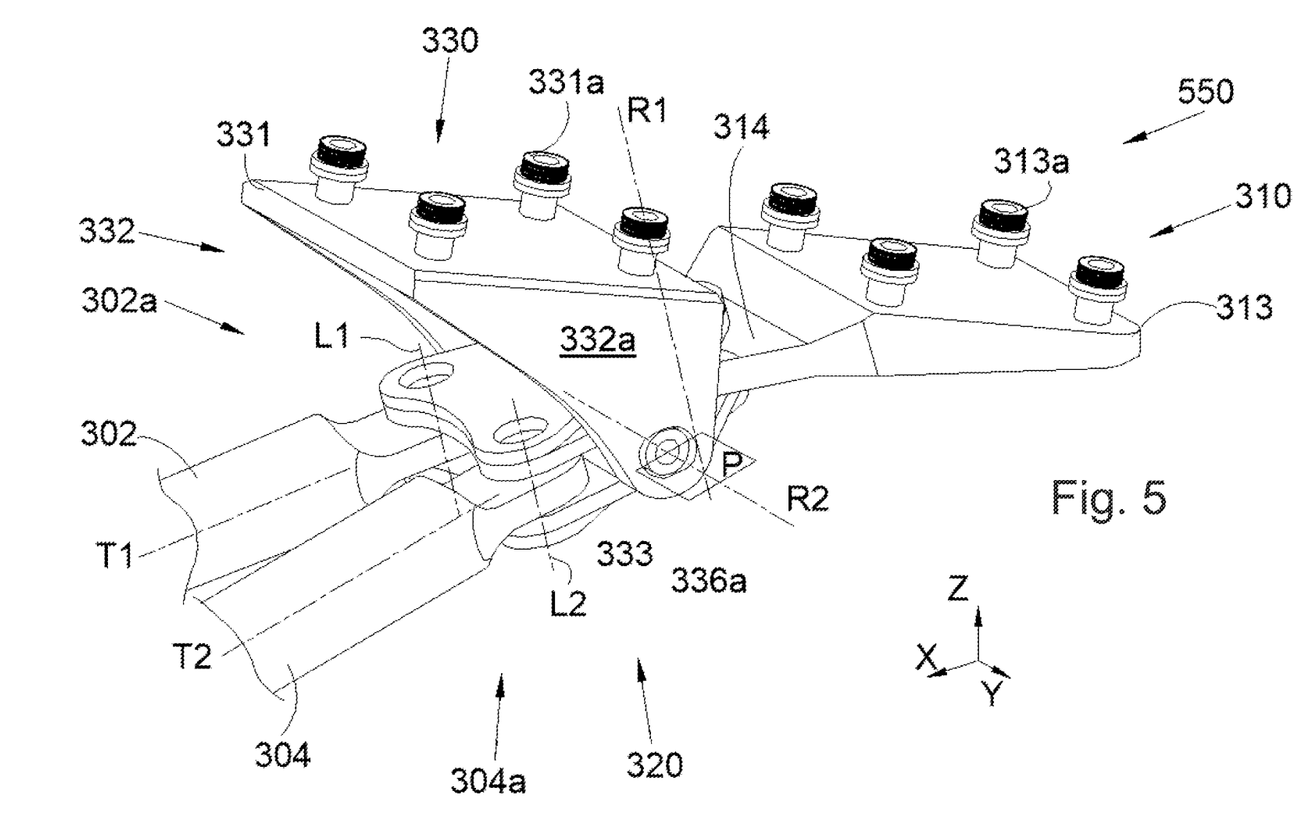
FIG. 5 is a perspective view of a device for reacting thrust forces of the propulsion assembly shown in FIG. 2, according to a second embodiment of the invention.

FIGS. 3 and 4 show a device for reacting thrust forces 350 according to a first embodiment of the invention and FIG. 5 shows a device for reacting thrust forces 550 according to a second embodiment of the invention.

The device for reacting thrust forces 350, 550 has a main fitting 310 fastened to the lower face 104a of the pylon 104, a spreader 320 mounted so as to be able to pivot on the main fitting 310, and two rods 302 and 304 for reacting the thrust forces of the engine that are disposed on either side of the median vertical plane V and articulated to the spreader 320.

The main fitting 310 comprises a planar sole 313 pressed against the lower face 104a of the pylon 104. The main fitting 310 is fastened to the pylon 104, for example, through the use of four tension bolts 313a through through-bores provided for that purpose in the sole 313.

Each rod 302, 304 has a front end 302b, 304b articulated to the engine 204 of the turbomachine 102 and a rear end 302a, 304a articulated to the spreader 320, and extends longitudinally along a longitudinal axis T1, T2, called force transmission axis. The two force transmission axes T1, T2 are inclined with respect to the horizontal and get closer to one another in a direction going from the front towards the rear of the propulsion assembly 100 (in other words, the axes T1, T2 are convergent in a direction going from the front towards the rear of the propulsion assembly 100). The plane containing the two force transmission axes T1 and T2 is called the mean plane for transmission of the thrust forces P. Each rod 302, 304 advances from the bottom towards the top going from the front towards the rear of the propulsion assembly 100.

The spreader 320 is connected to the main fitting 310 by a rear connection point constituting a rotation about a rotation axis R1, called main axis, orthogonal to the mean plane for transmission of the thrust forces P and comprised in the median vertical plane V.

In the embodiment of the invention that is presented here, the rear connection point is realized between the central flange 314 of the main fitting 310 and a female rear clevis 322 of the spreader 320.

The central flange 314 is arranged at the front of the main fitting 310 and is as one with the planar sole 313 and extends forwards, parallel to the mean plane for transmission of the thrust forces P. A through-bore 315 is made in the central flange 314, and its bore axis is coaxial with the main axis R1.

The female rear clevis 322 into which the central flange 314 is introduced is arranged at the rear of the spreader 320. The female rear clevis 322 is constituted of two mutually parallel rear arms 322a-b perpendicular to the main axis R1, and each rear arm 322 a-b is passed through by a rear bore 323 of which the axis is coaxial with the main axis R1.

The device for reacting thrust forces 350, 550 has a rear connection pin 324.

The introduction of the central flange 314 into the female rear clevis 322 and the fitting of the rear connection pin 324 into the through-bore 315 of the central flange 314 and the rear bores 323 of the female rear clevis 322 realize the pivot connection about the main axis R1. In the embodiment of the invention that is presented here, the connection pin 324 has a pin 324a and a bearing 324b into which said pin 324a is inserted and wherein said bearing 324b is inserted with a tight fit into the through-bore 315 of the central flange 314 and into the rear bores 323 of the female rear clevis 322.

The rear end 302a, 304a of each rod 302, 304 is articulated to the spreader 320 by a front connection point constituting a rotation about a first front connection axis L1 for one rod 302 and about a second front connection axis L2 for the other rod 304. The two front connection axes L1, L2 extend parallel to the main axis R1 and symmetrically on either side of the median vertical plane V.

In the embodiment of the invention that is presented here, each front connection point is realized between the rear end 302a, 304a of the corresponding rod 302, 304 and a female front clevis 326 of the spreader 320.

Each female front clevis 326 into which the rear end 302a, 304a of a rod 302, 304 is introduced is arranged at the front of the spreader 320.

The rear end 302a, 304a of each rod 302, 304 is passed through by a through-bore 302c, 304c of which the axis is coaxial with the corresponding front connection axis L1, L2.

Each female front clevis 326 is constituted of two mutually parallel front arms 326a-b perpendicular to the front connection axis L1, L2, and each front arm 326a-b is passed through by a front bore 327 of which the axis is coaxial with the corresponding front connection axis L1, L2.

The device for reacting thrust forces 350, 550 has a front connection pin (not shown).

The introduction of the rear end 302a, 304a of a rod 302, 304 into a female front clevis 326 and the fitting of the front connection pin into the through-bore 302c, 304c of the rod 302, 304 and into the front bores 327 of the female front clevis 326 realize the pivot connection about the front connection axis L1, L2. Preferentially, each rear end 302a, 304a is mounted in a ball-jointed manner on the front connection pin via a ball joint ring inserted into the through-bore 302c, 304c of the corresponding rod 302, 304, wherein the connection pin is inserted without clearance into the ball joint ring and the front bores 327 of the female front clevis 326.

A primary force transfer path is thus created between the rods 302 and 304 and the main fitting 310 through the spreader 320 and in particular through the various front 326 and rear 322 female devises and the corresponding connection pins.

The device for reacting thrust forces 350, 550 has a secondary fitting 330 fastened to the lower face 104a of the pylon 104 in front of the main fitting 310. The secondary fitting 330 comprises a planar sole 331 pressed against the lower face 104a of the pylon 104. The secondary fitting 330 is fastened to the pylon 104, for example, through the use of four tension bolts 331a through through-bores provided for that purpose in the sole 331.

The spreader 320 is articulated to the secondary fitting 330.

The secondary fitting 330 also has a secondary female clevis 332 constituted of two secondary arms 332a-b, each one being passed through by a hole 333 of oblong shape. The two holes 333 are aligned along an axis R2, called secondary axis, which is included in the mean plane for transmission of the thrust forces P and perpendicular to the median vertical plane V, i.e. in this case oriented parallel to the transverse direction Y and horizontally.

The major axis of each hole 333 is included in the mean plane for transmission of the thrust forces P and perpendicular to the secondary axis R2.

The spreader 320 is passed through by a cylindrical opening 334 coaxial with the secondary axis R2 and the spreader 320 is inserted into the secondary female clevis 332 of the secondary fitting 330 so as to align the holes 333 and the opening 334 in order to house a cylindrical secondary connection pin 336 therein. The secondary connection pin 336 is said to be a backup connection pin (or "waiting fail-safe") that is activated in the event of failure of the primary path.

The backup connection pin 336 is inserted with a tight fit into the opening 334 and with clearance into the holes 333.

Figure 6:
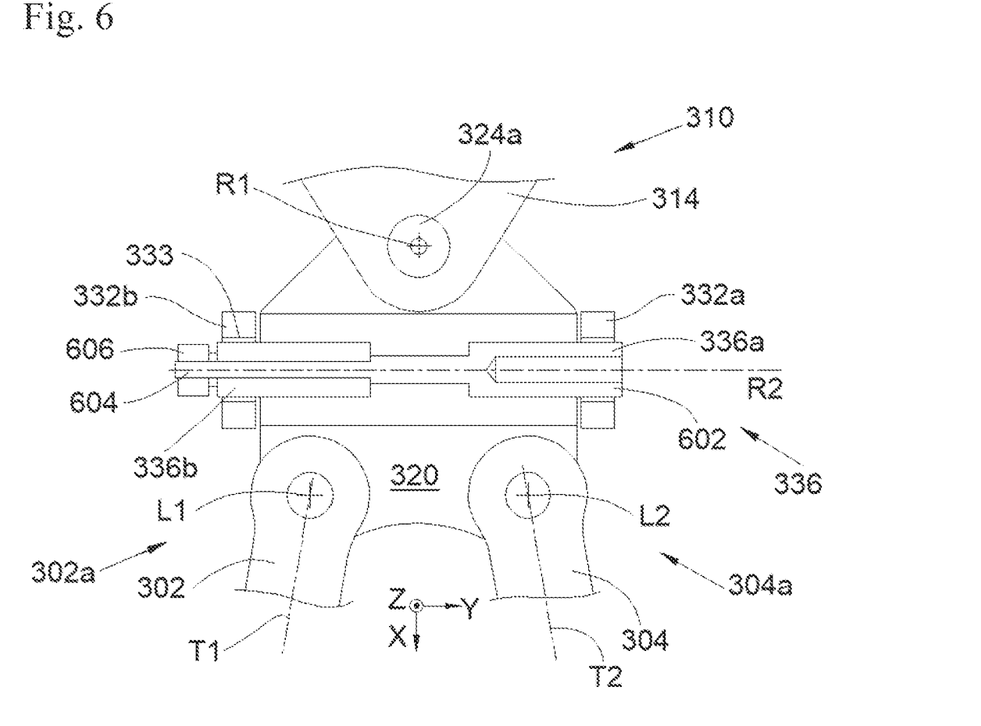
FIG. 6 is a view in cross section on the mean plane for transmission of the thrust forces P of the device for reacting thrust forces in FIG. 3.

FIG. 6 shows a cross section in the normal operating position, i.e. when the primary path is intact. In the event of the primary path breaking at the connection about the main axis R1 (of the central flange 314 or of the rear connection pin 324) or one of the rods 302 and 304, the primary path then fails and the backup connection pin 336 and the spreader 320 will then tilt so as to bring said backup connection pin 336 into contact with the edges of the holes 333 and the forces will then pass via a secondary force transfer path as far as the secondary fitting 330.

For mounting reasons, the backup connection pin 336 in this case has a male part 336a and a female part 336b. The male part 336a has a first end 602 of which the diameter is equal to the diameter of the opening 334 and a second end 604 that is of smaller diameter and threaded. The female part 336b has an outer diameter equal to the diameter of the opening 334 and an inner diameter equal to the diameter of the second end 604 so as to fit thereon. The male part 336a and the female part 336b are secured by a clamping nut 606 that is screwed onto the second end 604.

In the embodiment of the invention that is shown in FIG. 3 and FIG. 4, the rear engine attachment 208 is articulated to the main fitting 310, while in the embodiment of the invention that is presented in FIG. 4, the rear engine attachment 208 is separate from the main fitting 310.

In the embodiment of the invention that is presented in FIG. 3 and FIG. 4, the rear engine attachment 208 has a rear rod 402 with three points, of which one point 402a, included in the median vertical plane V, ensures mounting articulated to the main fitting 310, and of which two points 402b-c, which are symmetrical to one another with respect to the median vertical plane V, ensure mounting articulated to the engine 204 of the turbomachine 102. The axis of articulation of each point 402a-c is generally parallel to the longitudinal axis of the turbomachine 102.

The rear rod 402 is mounted articulated in a rear clevis 404 provided beneath the sole 313 of the main fitting 310.

Figure 7:
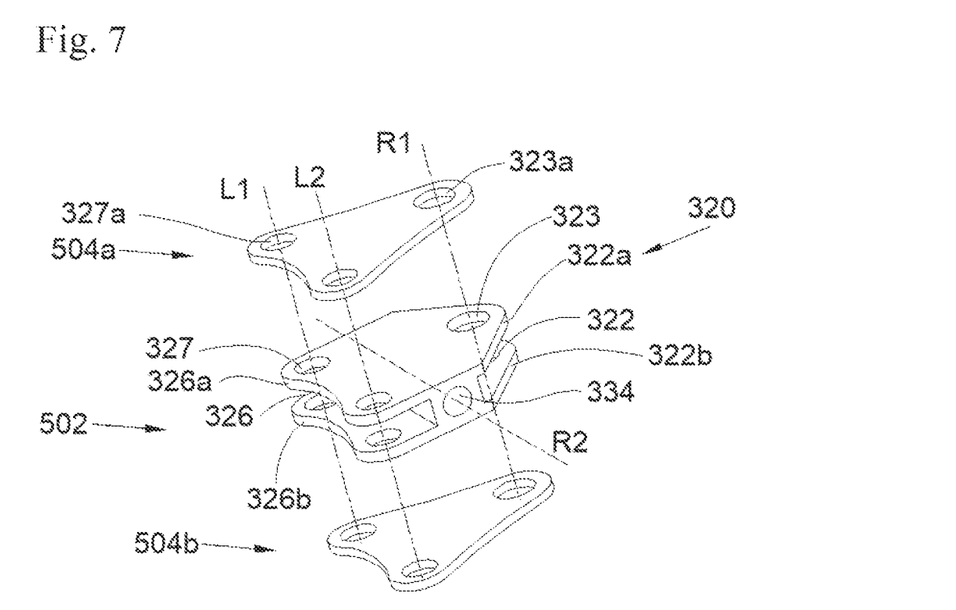
FIG. 7 is an exploded perspective view of a spreader implemented in the invention.

According to one particular embodiment of the invention, the spreader 320 is constituted of three elements that are shown in detail and in an exploded view in FIG. 7. The spreader 320 has a body 502 and two flanks 504a-b adjoining the body 502 on either side of the body 502 with respect to the mean plane for transmission of the thrust forces P, i.e. in this case there is one flank 504a above the body 502 and one flank 504b below the body 502.

The body 502 is passed through by the opening 334 and it has the rear arms 322a-b for forming the female rear clevis 322 and the front arms 326a-b for forming the two female front devises 326. Each flank 504a-b bears externally against a rear arm 322a-b of the female rear clevis 322 and a front arm 326a-b of each female front clevis 326.

For each rear bore 323 of the female rear clevis 322 that is coaxial with the main axis R1, the flank 504a-b adjoining the rear arm 322a-b corresponding to said rear bore 323 is passed through by a rear secondary bore 323a coaxial with said rear bore 323.

The rear connection pin 324 also passes through the rear secondary bores 323a of the flanks 504a-b. The flanks 504a-b are sandwiched between the ends of the rear connection pin 324.

In the same way, for each front bore 327 of a female front clevis 326 that is coaxial with a front connection axis L1, L2, the flank 504a-b adjoining the front arm 326a-b corresponding to said front bore 327 is passed through by a front secondary bore 327a coaxial with said front bore 327. The corresponding front connection pin also passes through the front secondary bores 327a of the flanks 504a-b. The flanks 504a-b are sandwiched between the ends of each front connection pin.

Thus, in the event of failure at the body 502, and in particular at a female clevis 322, 326, the flanks 504a-b take over and constitute a secondary force transfer path with respect to the body 502 that constitutes the primary force transfer path.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, said propulsion assembly having a median vertical plane and comprising:
   a turbomachine,
   a pylon,
   at the front, a front engine attachment fastening the turbomachine to the pylon,
   at the rear, a rear engine attachment fastening the turbomachine to the pylon, and
   a device for reacting thrust forces comprising:
      a main fitting fastened beneath the pylon,
      a spreader mounted so as to be able to pivot on the main fitting about a main axis and having an opening,
      two rods for reacting the thrust forces of an engine that are disposed on either side of the median vertical plane, each rod having a front end articulated to the turbomachine and a rear end articulated to the spreader, wherein each rod has a longitudinal axis, wherein the two longitudinal axes define a mean plane for transmission of the thrust forces, wherein the main axis is orthogonal to the mean plane for transmission of the thrust forces and comprised in the median vertical plane, wherein the rear end of each rod is articulated to the spreader about a front connection axis parallel to the main axis and wherein the two front connection axes are symmetrical with respect to the median vertical plane,
      a secondary fitting fastened beneath the pylon in front of the main fitting and having a secondary female clevis constituted of two secondary arms, each one being passed through by a hole of oblong shape wherein the two holes are aligned along a secondary axis included in the mean plane for transmission of the thrust forces and perpendicular to the median vertical plane, and wherein a major axis of each hole is included in the mean plane for transmission of the thrust forces and perpendicular to the secondary axis, wherein the spreader is housed in the secondary female clevis of the secondary fitting, wherein the opening is coaxial with the secondary axis, and
      a backup connection pin inserted with a tight fit into the opening and with clearance into the holes
   wherein the main fitting comprises a central flange passed through by a through-bore coaxial with the main axis,
   wherein the spreader has a female rear clevis into which the central flange is introduced,
   wherein the female rear clevis comprises two rear arms wherein each one is passed through by a rear bore coaxial with the main axis,
   wherein the device for reacting thrust forces has a rear connection pin fitted in the through-bore of the central flange and the rear bores of the female rear clevis,
   wherein, for each rod, the spreader has a female front clevis into which the rear end of said rod, which is passed through by a through-bore coaxial with the corresponding front connection axis, is introduced,
   wherein each female front clevis is constituted of two front arms and each one is passed through by a front bore coaxial with the corresponding front connection axis, and
   wherein for each rod, the device for reacting thrust forces has a front connection pin fitted in the through-bore of said rod and in the front bores of the female front clevis.

2. The propulsion assembly according to claim 1, wherein the rear engine attachment is articulated to the main fitting.

3. The propulsion assembly according to claim 1, wherein the spreader has a body and two flanks,
   wherein the body is passed through by the opening and has the rear arms and the front arms,
   wherein each flank bears externally against a rear arm and a front arm of each female front clevis, wherein for each rear bore, the flank adjoining the rear arm corresponding to said rear bore is passed through by a rear secondary bore coaxial with said rear bore, wherein the rear connection pin also passes through the rear secondary bores of the flanks, wherein for each front bore of a female front clevis, the flank adjoining the front arm corresponding to said front bore is passed through by a front secondary bore coaxial with said front bore, and wherein the front connection pin also passes through the front secondary bores of the flanks.

4. An aircraft comprising:

a wing, and the propulsion assembly according to claim 1, wherein the pylon is fastened beneath the wing.

* * * * *